I. A. MANN.
PLUMBING FIXTURE.
APPLICATION FILED JAN. 9, 1913.

1,132,954.

Patented Mar. 23, 1915.
3 SHEETS—SHEET 1.

WITNESSES

INVENTOR
Ira A. Mann
by attys

I. A. MANN.
PLUMBING FIXTURE.
APPLICATION FILED JAN. 9, 1913.
1,132,954.
Patented Mar. 23, 1915.
3 SHEETS—SHEET 2.
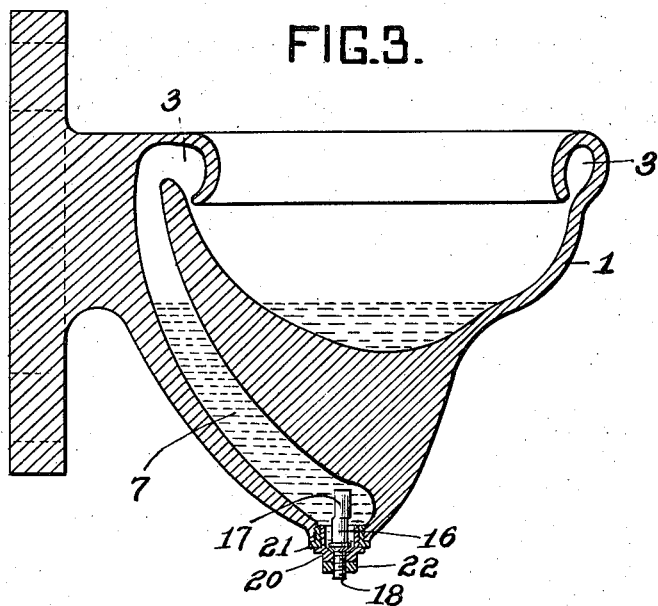
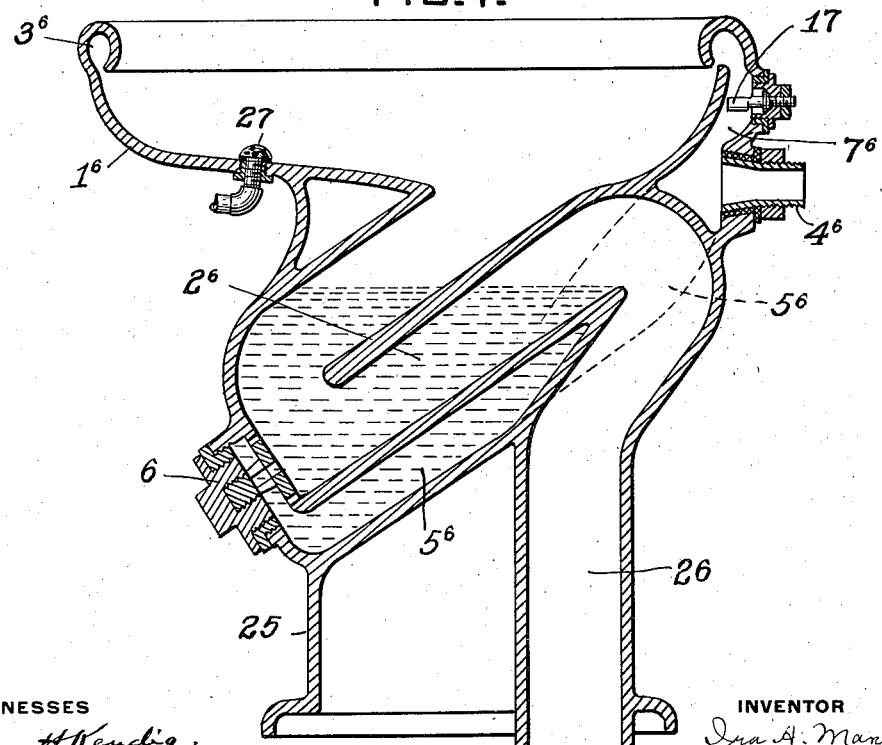
WITNESSES
INVENTOR

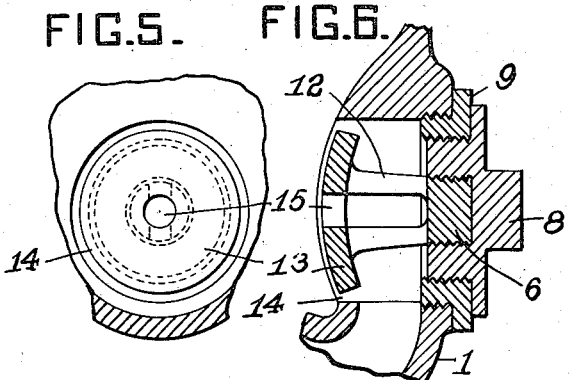
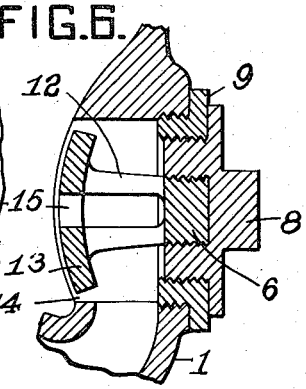
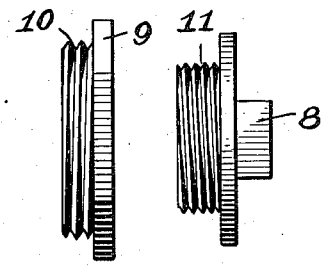
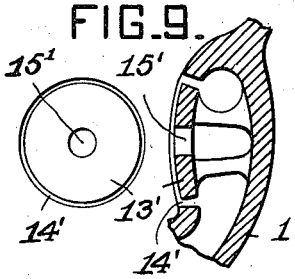
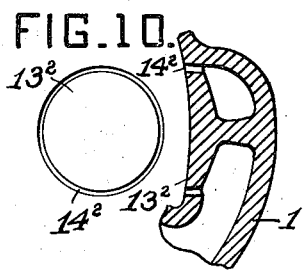
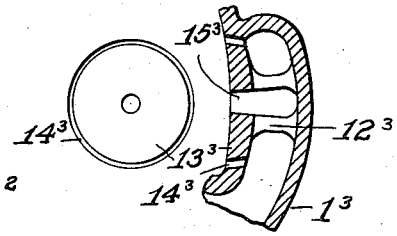
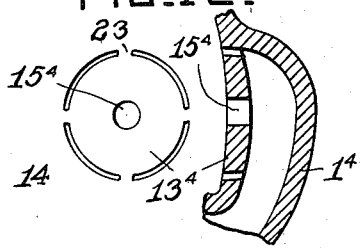
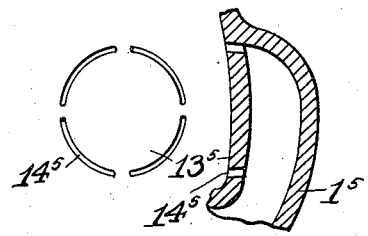
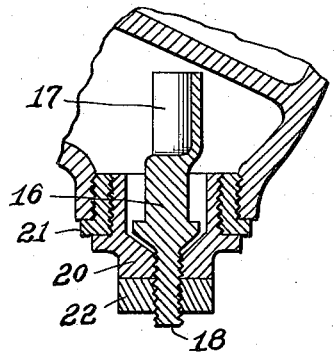
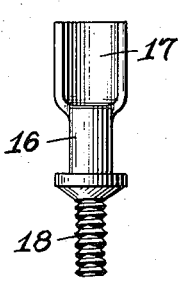
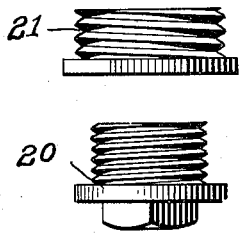

UNITED STATES PATENT OFFICE.

IRA A. MANN, OF PITTSBURGH, PENNSYLVANIA.

PLUMBING-FIXTURE.

1,132,954.   Specification of Letters Patent.   Patented Mar. 23, 1915.

Application filed January 9, 1913. Serial No. 741,003.

*To all whom it may concern:*

Be it known that I, IRA A. MANN, a citizen of the United States, residing at Pittsburgh, in the county of Allegheny and State of Pennsylvania, have invented certain new and useful Improvements in Plumbing-Fixtures, of which the following is a specification.

The invention relates to plumbing fixtures employing bowls and flushing means such as water closets, clinic slop sinks, urinals, and the like, the drawings illustrating the application to a clinic slop sink. The invention has for its primary objects; the provision of an apparatus of the character specified in which the jet means is arranged in a new and advantageous manner for securing accessibility and efficient action; the provision of a flushing means having its outlet portion removable and adjustable to provide for varying water pressure conditions and at the same time acting as a drainage fixture; the provision of means whereby the flow of water to the flushing rim may be governed to suit conditions; and the provision of a jet plug so located that it can be used as a drain fixture. Certain embodiments of the invention are illustrated in the accompanying drawings, wherein—

Figure 1:
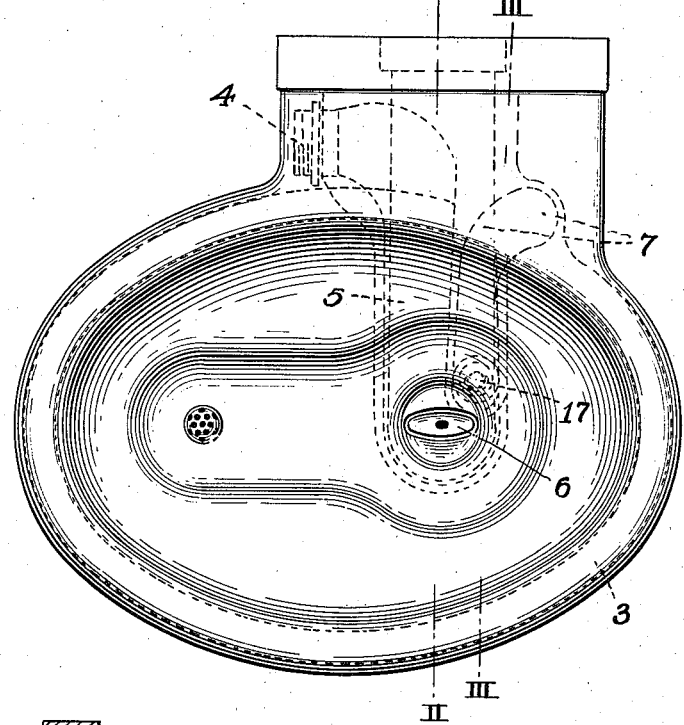
Figure 2:
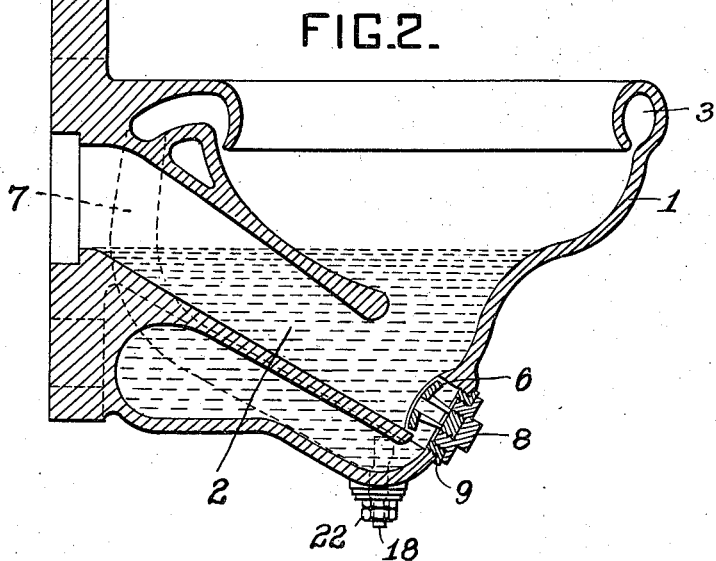

Figure 1 is a plan view of a clinic slop sink of the wall type, with my improvement applied thereto; Figs. 2 and 3 are vertical sections through the sink, on the lines II—II and III—III respectively of Fig. 1; Fig. 4 is a vertical section through a modified form of sink of the floor type; Figs. 5, 6, 7, and 8 are enlarged detail views of the jet plug employed in the construction of Figs. 1, 2, and 3; Figs. 9, 10, 11, 12, and 13 are detail views of modified types of jet outlet constructions, and Figs. 14, 15, and 16 are enlarged detail views of the means employed for regulating the flow of water to the flushing rim of the bowl in the construction of Figs. 1, 2, 3, and 4.

Referring to the construction shown in Figs. 1, 2, and 3; 1 is the bowl, preferably of vitreous material, provided with an upwardly directed outlet passage 2 leading from the lower end of the bowl cavity, and with a rim passage 3 opening downward to provide the usual rim flushing means. Flushing water is supplied to the apparatus at the inlet connection 4, which inlet connection leads to the passage 5 (Figs. 1 and 2). As indicated in Fig. 2, the forward end of the passage 5 is turned upward to supply a flushing jet through the plug 6 for the passage 2. The front end of the passage 5 is continued laterally past the plug 6 as indicated in Fig. 1, and merges into the passage 7 (see Fig. 3). This passage 7 extends laterally and upwardly and supplies the rim cavity 3.

The provision of the removable flushing plug 6 constitutes one of the features of my invention, such plug being shown in detail in Figs. 5, 6, 7, and 8. As indicated in Fig. 6, the plug 6 is threaded into a socket 8 which in turn is threaded into a collar 9, the parts 6, 8, and 9 being preferably of some non-corrodible metal. The threads on the collar 9 are preferably left hand, while the threads on the sockets 8 are right hand, so that in unscrewing the socket 8 there is no tendency to unscrew the collar 9. The stem 12 of the plug 6 is preferably of spider form to permit of the ready flow of the water beneath the head 13 of the plug, and the head 13 has its periphery spaced away from the surrounding wall of the bowl so as to provide the annular jet opening 14. The center of the plug is also provided with a jet passage 15, so that a solid jet of water is directed through the outlet passage 2 (Fig. 2), and an annular jet passing close to the walls of the outlet passage 2 is also directed through such passage. The peripheral annular jet in the passage 2 serves to eliminate the friction between the body of water in the passage and the walls of the passage, so that a much lower pressure through the opening 15 in the plug 6 is required than if no annular jet were employed. The action of the device is also rendered more effective by causing the walls of the passage 2 to diverge gradually from the lower end of such passage to the upper end thereof as indicated in Fig. 2.

The removable jet plug construction as above described is advantageous for several reasons. In the first place a drainage passage is provided by this arrangement, the plug being at substantially the lowest point of the bowl cavity and its removal giving ready access to the passage 2, so that such passage may be readily cleaned out if it become clogged up, and any articles or instruments which have lodged in or adjacent to the lower end of this passage may be readily recovered by removing the socket 8 and the plug 6 carried thereby. And in the second place the construction permits of an adjustment of the supply passages through and around the plug to suit varying conditions of water pressure. The plug 6 may readily be removed and another plug of such dimentsions as to give a different flow readily substituted, or the passages through and around the plug may be readily varied by means of a file or other tool. It will also be seen that any foreign article tending to clog the opening through the plug itself may be easily removed when the plug is taken from its position in the wall of the bowl.

In order to regulate the flow of water through the passage 7 to the rim 3 the regulating device 16, shown in position in Fig. 3 and in enlarged detail in Figs. 14, 15, and 16, is employed. This device 16 is provided at its upper end with a plate-like member 17, and at its lower end with a threaded stem 18, the latter engaging a socket 20 screwthreaded into the collar 21. The socket 20 and collar 21 are provided respectively with right and left handed threads as in the socket 8 and collar 9 heretofore described, and the member 16 is held locked in any position of rotary adjustment, by means of the locknut 22. It will be seen that the plate 17 serves to obstruct the flow of water through the passage 7 more or less—depending upon its rotary position of adjustment. If turned edgewise with respect to the water flowing through the passage very little resistance is offered, while if turned flatwise with respect to the flow of water, such flow is very materially cut down. By this arrangement the supply of water to the rim can be easily regulated to suit all conditions of pressure and proportion the flow of water to the rim to that of the jet means for the outlet passage 2. This not only avoids a waste of water in many cases, but renders the operation of the entire flushing system more positive and efficient, as too much or too little water to the rim interferes with the proper operation of the flushing means for the outlet passage. The socket 20 may also be used as a drain plug for the bowl.

Fig. 9 illustrates a modified form of jet device wherein the removable plug of the structure heretofore described is done away with and the jet means is integral with the material of the bowl 1'. As in the other form of construction, a plate 13' is provided with an opening 15' in the center, the plate 13' at its periphery being spaced away from the inclosing wall of the bowl to provide an annular flushing space 14'.

Fig. 10 illustrates another modification of the jet means in which the plate 13² is carried by the bowl 1² and arranged so as to provide the annular flushing space 14², there being in this construction, however, no central flushing orifice.

The flushing construction shown in Fig. 11 differs only slightly from that shown in Fig. 9, a plate 13³ being provided with a central orifice 15³ and supported upon a stem 12³ integral with the wall of the bowl 1³. The annular flushing space 14³ is provided as in the other types of construction.

In the construction of Fig. 12 the plate 13⁴ is supported from its edges by means of the solid portion 23 instead of by means of a stem extending rearwardly from the plate as in the construction of Figs. 9, 10, and 11. The annular space 14⁴ is thus an interrupted one. The plate 13⁴ is provided at its center with a flushing orifice 15⁴.

In the construction Fig. 13 the plate 13⁵ is supported as in the construction of Fig. 12, thus providing an interrupted annular space 14⁵, but in this construction no central discharge orifice is provided.

Fig. 4 illustrates a clinic slop sink of a type somewhat different from the structure of Figs. 1, 2 and 3, the primary difference residing in the fact that the sink is supported from the floor upon a base 25, instead of being supported from the wall as in the other type of construction. In this structure 1⁶ is the bowl, 2⁶ is the upwardly extending discharge passage which turns at its upper end and discharges through the passage 26, 3⁶ is the flushing passage in the rim, 4⁶ is the water inlet connection, and 5⁶ is the passage leading to the jet plug 6. The rim cavity 3⁶ is supplied with water through the passage 7⁶ in which is located an obstructing plate 17. 27 is the usual bidet washout means employed in all clinic sinks. The plug 6 and plate 17, and the parts carrying these parts are precisely the same as in the type of construction shown in Figs. 1, 2, and 3, so that no further description thereof is necessary. As in the type of apparatus shown in Figs. 1, 2, and 3 the outlet passage 2⁶ gradually increases in diameter from its lower to its upper end, thus reducing the friction and lessening the liability of stoppage.

The volume of water in the passage 7⁶ is much less in the apparatus of Fig. 4 than that of the apparatus of Figs. 1, 2, and 3 which fact renders the apparatus of Fig. 4 less advantageous, as there is a smaller volume of water to flow into the bowl after the supply of water to the apparatus under pressure is cut off. In the apparatus of Figs. 1, 2, and 3 the combined volumes of water in the rim cavity 3 and passage 7 is so large that no provision need be made for supplying the bowl after the flushing operation.

Having thus described my invention and illustrated its use, what I claim as new and desire to secure by Letters Patent, is the following:

1. The combination with a bowl having an upwardly directed outlet passage with an opening through the wall of the bowl opposite the lower end of the passage and having a flushing supply passage leading to a point adjacent the said opening, of a removable solid closure plug closing the said opening and provided with a jet member pointing up the said outlet passage and communicating with the said supply passage in the bowl.

2. The combination with a bowl having within its walls an upwardly extending outlet passage and a flushing supply passage leading to a point opposite the lower end of the outlet passage, the said bowl also having an opening through its wall opposite the lower end of the outlet passage, of a solid removable closure plug for the said opening, and a removable jet means opposite the plug and communicating with the said supply passage.

3. The combination with a bowl having within its walls an upwardly extending outlet passage and a flushing supply passage leading to a point opposite the lower end of the outlet passage, the said bowl also having an opening through its wall opposite the lower end of the outlet passage, of a solid removable closure plug for the said opening, and a hollow jet plug carried on the inner side of the plug with its interior communicating with the said supply passage.

4. The combination with a bowl having within its walls an upwardly extending outlet passage and a flushing supply passage leading to a point opposite the lower end of the outlet passage, the said bowl also having an opening through its wall opposite the lower end of the outlet passage, of a solid removable closure plug for the said opening, and removable jet means comprising a jet plug carried by the closure plug, and having an opening through its central portion, and having its periphery spaced away from the opening in which it is mounted providing an annular jet opening, the said openings around and through the plug communicating with the said supply passage.

5. The combination with a bowl having within its walls an upwardly extending outlet passage and a flushing supply passage leading to a point opposite the lower end of the outlet passage, the said bowl also having an opening through its wall opposite the lower end of the outlet passage, of a solid removable closure plug for the said opening, and removable jet means comprising a plug carried by the closure plug having its periphery spaced away from the opening in which it is mounted providing a circumferential jet opening, the said opening around the plug communicating with the said supply passage.

6. The combination with a bowl having a flushing water supply passage within its walls, and an upwardly directed outlet passage with one of the outer walls of the bowl opposite the lower end of the discharge passage, of an imperforate removable flushing plug extending through the said wall and having a passage on its inner side connected to the flushing water supply passage in the wall of the bowl and having its discharge end directed up the said outlet passage.

7. The combination with a bowl having an upwardly directed outlet passage with one of the outer walls of the bowl opposite the lower end of such passage, of a jet member secured in the said wall opposite the end of the said passage and provided with a central discharge opening, a further discharge opening being provided around the periphery of the said jet member to give a peripheral jet.

8. The combination with a bowl having an upwardly directed outlet passage with one of the outer walls of the bowl opposite the lower end of such passage, of a jet member secured in the said wall opposite the end of the said passage and provided with a central discharge opening, the periphery of the said member being spaced away from the wall in which the jet member is mounted, to provide an annular jet surrounding the central jet.

9. The combination with a bowl having an upwardly directed outlet passage and a jet supply passage, of an imperforate removable plug opposite the end of the passage, and a removable member provided with a jet passage communicating with the supply passage mounted in the said plug.

10. The combination with a bowl having an upwardly directed outlet passage and a jet supply passage, of a collar screw threaded into the wall of the bowl opposite the lower end of said passage, and a solid flushing plug screw threaded into the said collar and having a jet supply passage in its inner side communicating with the supply passage, one of the said screw threaded engagements being with left hand threads and the other with right hand threads.

11. The combination with a bowl having an upwardly directed outlet passage, of a flushing means for the outlet passage comprising a circular member opposite the lower end of the passage with its periphery spaced away from the surrounding wall of the bowl to provide a substantially continuous annular jet opening, a stem for supporting the said member from the rear, and means for supplying water to the space behind the said member.

12. The combination with a bowl having an upwardly directed outlet passage, of a flushing means for the outlet passage comprising a circular member opposite the lower end of the passage with its periphery spaced away from the surrounding wall of the bowl to provide a substantially continuous annular jet opening, and having a discharge within such periphery, a stem for supporting the said member from the rear, and means for supplying water to the space behind the said member.

13. In combination in a plumbing fixture, a bowl, an upwardly directed outlet passage leading from the lower portion of the bowl, a flushing rim, a jet opening adjacent the lower portion of said outlet passage, a water supply leading first to the jet opening and then to the flushing rim, a removable plug opposite the lower portion of the passage between the jet opening and the flushing rim, and an adjustable obstructing means lying in the passage and carried by the plug, the said plug serving as a drain fixture for the bowl.

In testimony whereof I have hereunto signed my name in the presence of the two subscribed witnesses.

IRA A. MANN.

Witnesses:
LETITIA A. MYERS,
ARCHWORTH MARTIN.